July 11, 1967 M. L. HALVERSON ETAL 3,330,129
DISPENSING FREEZER WITH FLAVOR SELECTION
Filed Aug. 2, 1965 2 Sheets-Sheet 1

MAYNARD L. HALVERSON
ROBERT S. PATCH
INVENTOR.

BY Seed & Berry

ATTORNEYS

July 11, 1967 M. L. HALVERSON ETAL 3,330,129
DISPENSING FREEZER WITH FLAVOR SELECTION
Filed Aug. 2, 1965
FIG. 2
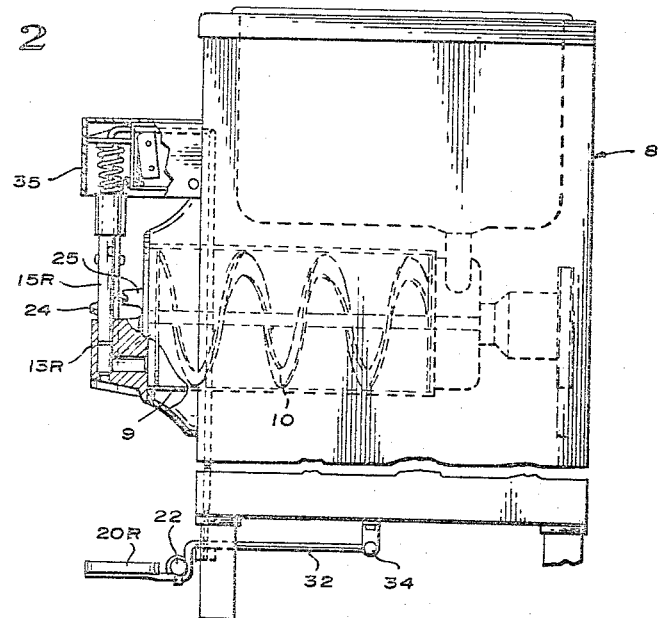
FIG. 3
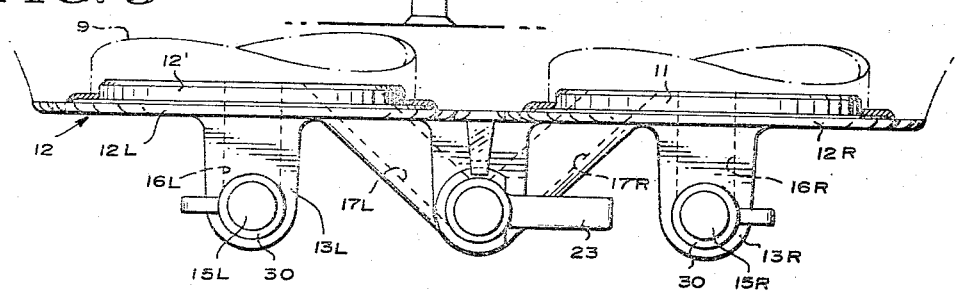
FIG. 4
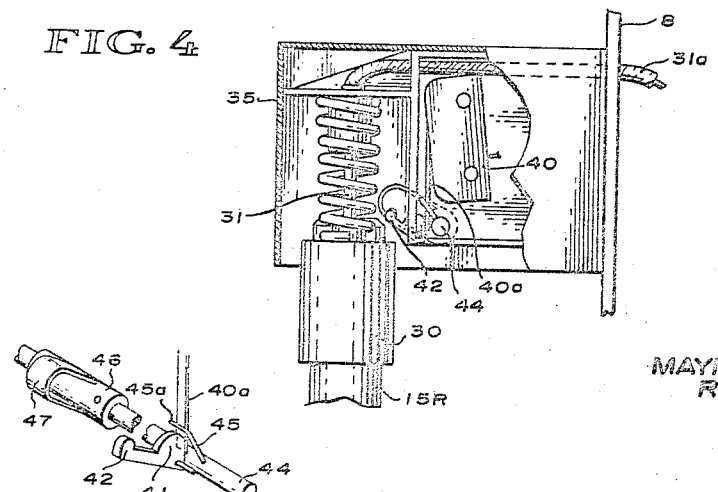
FIG. 5
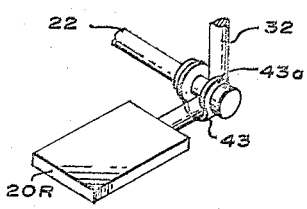
FIG. 6
MAYNARD L. HALVERSON
ROBERT S. PATCH
INVENTOR.
BY *Seed & Berry*
ATTORNEYS United States Patent Office 3,330,129
Patented July 11, 1967

3,330,129
DISPENSING FREEZER WITH FLAVOR SELECTION
Maynard L. Halverson, Seattle, and Robert S. Patch, Bainbridge Island, Wash., assignors to Sweden Freezer Manufacturing Co., Seattle, Wash., a corporation of Washington
Filed Aug. 2, 1965, Ser. No. 476,629
7 Claims. (Cl. 62—179)

ABSTRACT OF THE DISCLOSURE

The invention is a dispensing freezer which will selectively dispense either of two flavors of frozen product from a pair of side-by-side freezing cylinders, or a combination of both flavors. In particular the invention provides: (A) A removable cover for the side-by-side freezing cylinders. (B) Independent manual dispensing handles for each freezing cylinder plus a centrally located handle allowing for mixed product from the two freezing cylinders. (C) A foot operated treadles for dispensing and (D) Automatic initiation of the dasher motors in the freezing cylinders upon movement of the handles or treadle to the dispending position.

The present invention relates to dispensing freezers for frozen comestibles such as ice cream, frozen custard, milk shakes, slush ice, etc., and more particularly to machines of this type which can dispense more than one flavor of frozen product.

A principal object of the invention is to provide an improved dispensing freezer by which the operator can conveniently selectively dispense either of two flavors of frozen product, or a combination of both flavors. The invention further aims to provide such a machine by which the operator can also easily selectively dispense both flavors independently at the same time while holding cones or other receptacles for the two flavors in both hands.

In carrying out the above objections, the invention further aims to provide such a machine which is of relatively simple and economical construction, is reliable and easy to operate, and which can be readily disassembled and cleaned.

Other more particular objects and advantages of the invention, will, with the foregoing, appear and be understood in the course of the following description and claims, the invention consisting in the novel construction and in the adaptation and combination of parts hereinafter described and claimed.

In the accompanying drawings:

FIG. 2 is a fragmentary side elevational view partly in vertical section, of the machine at a reduced scale.

FIG. 3 is a detail top plan view of the cover and valve assembly taken as indicated by line 3—3 of FIG. 1.

FIG. 4 is a detail elevational view taken as shown by line 4—4 of FIG. 1.

FIG. 5 is a detail perspective view showing the connection between the cross bar and one of the treadles.

FIG. 6 is a detail perspective view illustrating the micro-switch operating mechanism in one of the outrigger housings.

Figure 1:
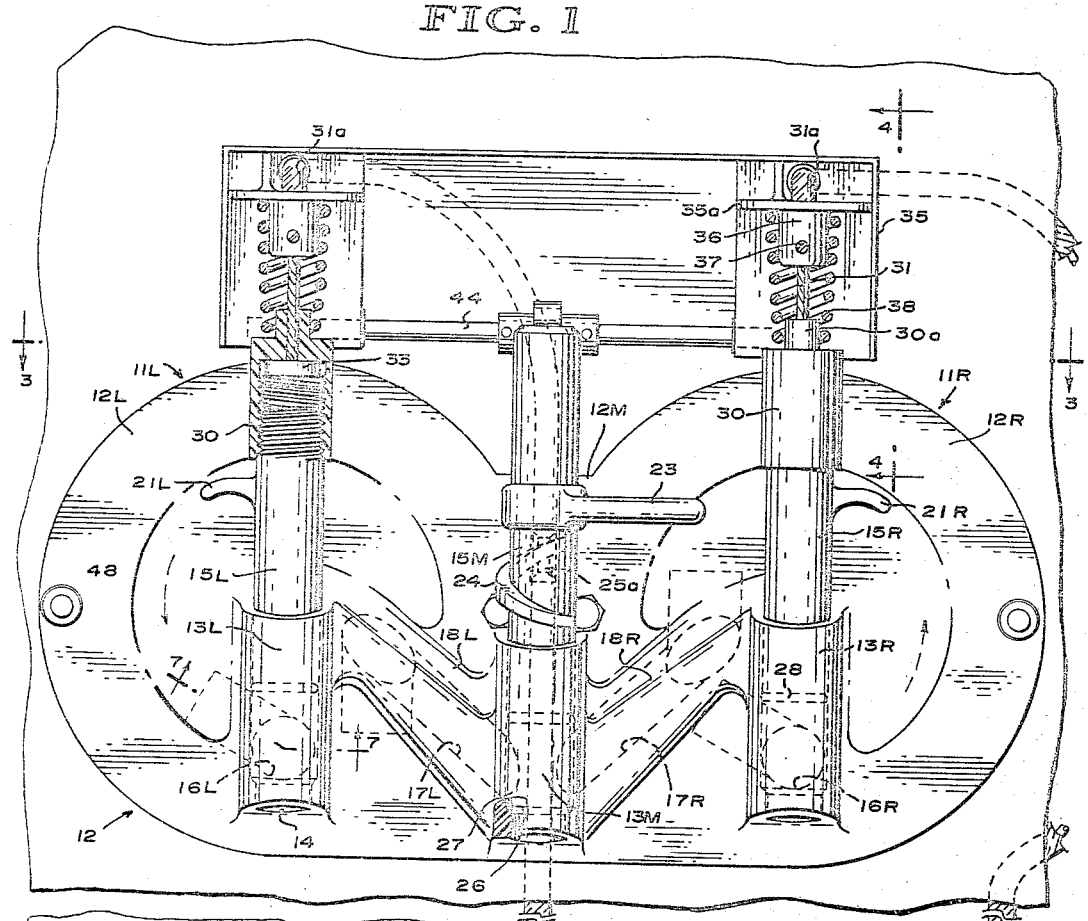
FIG. 1 is a fragmentary front plan view of a machine embodying the present invention.

Referring to the drawings, numeral 8 designates the cabinet for a pair of laterally spaced dispensing freezers 11R–11L each comprising a refrigerated freezing cylinder 9, a motor-driven dasher 10 in the cylinder, a mix feed system, and a suitable control system, which may be as shown in Patent No. 2,924,951. A removable cover 12 of generally spectacle-like configuration presents a pair of rounded end portions 12R–12L closing the front of the freezing cylinders and joined by a bridge portion 12M. The portions 12R–12L each have a rearwardly projecting boss 12' fitting into the mouth of the respective freezing cylinder 9 and presenting rearwardly projecting stubs 10a in which the forward ends of the dashers 10 are journaled. In addition, the portions 12R–12L are formed with respective spigots 13R–13L for the two dispensing freezers while the bridge 12M has a central spigot 13M. Each of these spigots has a vertical through-bore 14 for receiving respective slide valves 15R, 15L and 15M.

Figure 7:
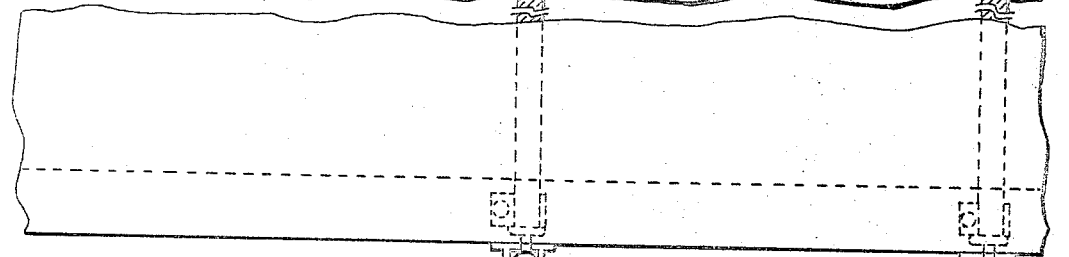
FIG. 7 is a fragmentary sectional view taken as indicated by line 7—7 of FIG. 1.
Figure 7:
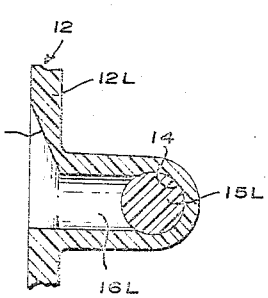

The cover 12 is formed with right and left discharge passages 16R–16L which connect the bores 14 of the spigots 13R–13L with the front of the respective freezing cylinders. In addition, for the center spigot 13M there is provided a pair of discharge mixing passages 17R–17L formed in a pair of upwardly diverging front ribs 18R–18L. These latter passages feed from both freezers 11R–11L so that when the center valve 15M is open, frozen product from both freezers merges and then discharges in a combination from the central spigot 13M. In this regard, the dashers 10 of the dispensing freezers each have an auger front, as for example, as shown in Patent 2,746,730, to urge the frozen product against the back of the cover 12 when the dasher is operating. The mouths of the discharge passages 16R–16L and 17R–17L at the back of the cover 12 are enlarged in the tangential direction counter to the direction of rotation of the respective dasher 10, the enlargement being shown in dotted lines in FIG. 1. As shown in FIG. 7 for the mouth of passage 16L, for example, such slopes forwardly from the back wall of the cover in a ramp effect 16L' into the passage proper.

In normal operation the two dispensing freezers 11R–11L will have different flavors of mix supplied thereto, as for example, vanilla flavored ice cream in one and chocolate flavored ice cream in the other. In the manner to be now described, by the present invention it is possible to selectively dispense one flavor of frozen product from spigot 13R, and/or a second flavor of frozen product from spigot 13L, or a combination of both flavors from the center spigot 13M. Opening of valve 15R is performed by depressing a treadle 20R or by manually lifting a valve handle 21R, and respective treadle 20L and handle 21L is provided for operation of valve 15L. To dispense simultaneously from both spigots 13R and 13L, a cross-bar 22 is arranged to cause simultaneous depression of the treadles 20R and 20L when the cross-bar is pressed; and to obtain a combination of product from both dispensing freezers a handle 23 on the center valve 15M is lifted manually.

The center valve 15M may be constructed in the manner disclosed in pending application Ser. No. 330,324, filed Dec. 13, 1963 now Patent No. 3,228,574. In this regard, directing attention to FIG. 1 it is seen that the valve 15M is formed with a spiral land 24 which extends about a half turn around the shank of the valve and terminates at generally flat upper and lower portions. When the valve is in operating position the land 24 extends radially of the valve into a cooperating guide slot 25a which is presented at the forward end of a lug 25. This lug projects forwardly above the center spigot 13M as an integral part of the cover bridge 12M. The handle 23 is preferably directed away from the center of the land 24, i.e., the handle is aimed rearwardly toward the lug 25, when the land is free of the guide slot 25a. This latter position represents the removal position of the valve since it is then free to be lifted endwise out of the bore of the spigot 13M for cleaning.

To open the center valve 15M it is only necessary to turn its handle 23 clockwise from the right to the left as viewed from the front. During this valve-opening movement the lower face of the land 24 is brought into engagement with the lower edge of the guide slot 25a and rides thereagainst causing the valve to lift according to the preselected lead of the spiral of the land. Similarly, to close the center valve 15M it is only necessary to turn the handle 23 counterclockwise from the left to the right as viewed from the front. During this valve-closing movement the valve 15M begins to partake of downward movement when the upper face of the spiral land 24 engages the upper edge of the guide slot 25a and downward travel continues until the upper face of the upper terminal portion of the land comes into engagement with the upper edge of the guide slot.

It will be noted that the lower end portion of each of the spigot bores 14 is formed with a frustro-conical seat 27 with which the bottom end of the respective valve 15R, 15L or 15M is beveled to mate at 26. At a distance above the bevel 26 in excess of the distance between the seat 27 and the upper edge of the intersection between the bores 14 and their respective discharge passages 16L, 17L-R and 16R, the valves have a circumferential groove for receiving an elastic O-ring 28 to seal the upper end of the bores 14. The upper ends of the valves 15R, 15L are threaded to receive screw caps 30.

The pedals 20L, 20R are mounted at the ends of treadles 32 in turn pivoted at 34 beneath the freezer housing. A cable 31 extends from the front of each treadle upwardly through a conduit 31a and then loops downwardly in an outrigger housing 35 to slidably pass through the upper end of the respective cap 30 and make connection with a button 33 housed in the cap. It will be noted that a boss 36 depends from a support wall 35a in the housing 35 above each valve 15R, 15L to receive the upper end of the respective conduit 31a and has a set screw 37 to grip the conduit. Compression springs 38 seat against the walls 35a and bear against the caps 30 to yieldingly urge the valves 15R, 15L downwardly into closed position. These springs are retained by the bosses 36 and upwardly projecting necks 30a on the caps.

The electrical control circuit for the dasher motor (not shown) not only energizes the motor while the product is being frozen in the freezing cylinder, but includes a parallel circuit path with a normally open microswitch 40 which is mounted in the outrigger housing 35. An actuating finger 40a for this microswitch generally parallels the axis of the valve and is arranged to be pushed rearwardly into switch closing position by a cam 41. This cam is made integral with a crank 42 which projects toward the spring 38 into the travel path of the head cap 30 so that as the related valve is lifted toward open position on the crank is pivoted upwardly thereby causing the cam 41 to engage the finger 40a and close the microswitch 40. Thus, whenever the valve is opened the electrical circuit for the dasher motor is completed.

As previously mentioned, a cross bar 22 is arranged to actuate both valves 15R–15L when the bar is depressed. To accomplish this function the ends of the bar 22 rest on the treadles 32—32 directly behind the foot pedals so that when the cross bar is pushed downwardly by foot pressure both treadles are also depressed thereby causing the two valves 15R–15L to open simultaneously and frozen product to be dispensed from both of the spigots 13R–13L. Thus the operator can depress the bar with his foot and have both of his hands free to place cones or receptacles beneath the spigots.

To make it possible for independent depression of the foot pedals 20R–20L with the bar 22 in place, a pair of elastic bands 43 with terminal eyes 43a are looped beneath respective of the treadle arms and each have their eyes 43a sleeved onto the respective end of the bar as shown in FIG. 5.

Directing attention particularly to the detail disclosure of FIG. 6, a rotary shaft 44 is journaled in the outrigger housings 35 to extend behind the travel path of the center valve 15M and behind the cranks 42. Anchored to the shaft 44 are a pair of L-pins 45 presenting terminal arms 45a extending directly in front of the microswitch fingers 40a so that when the shaft is turned clockwise as viewed in FIG. 6, the microswitches 40 are closed and both dasher motors are activated. To so turn the shaft 44 a sleeve with a forwardly projecting lever 47 is mounted on the center of the shaft so that the lever overhangs the top of the center valve 15M. By this arrangement whenever the center valve is lifted open it rocks the lever 47 upwardly and thereby turns the shaft 44 clockwise. As a result both dasher motors are energized so that frozen product will be dispensed simultaneously through the discharge passages 17R–17L and out the center spigot 13M.

Reviewing the operation of the machine, it is seen that the operator has four choices. He can obtain one flavor of frozen product by depressing the pedal 20R and can obtain a second flavor by operating the pedal 20L. If he wishes a combination of both flavors, he manually raises the handle 23 on the center valve 15M. Finally, if it is desired to dispense both flavors independently rather than in a combination the operator depresses the cross bar 22 with his foot to actuate both treadles 20R–20L simultaneously.

The cover and valve assembly can be readily disassembled for cleaning in the following manner. First the center valve 15M is removed by turning its handle 23 rearwardly into the space above the bridge portion 12M of the cover to overlie the lug 25. This removes the land 24 from the guide slot 25a in the lug 25, and hence frees the center valve to be lifted out of the spigot 13M. In this regard, there is sufficient resiliency in the pins 45 and lever 47 to permit the center valve to be moved upwardly past the lever 47. Following removal of the center valve the head caps 30 are unscrewed from the top of the valves 15R–15L, such being accomplished in opposition to the springs 38. Then thumb screws 48 are unscrewed to free the cover 12 from the cabinet 8 whereupon the cover and the three valves 15R, 15M and 15L, minus the caps 30, can be lifted a unit forwardly free of the cabinet. The valves 15R–15L can then be manually lifted from their spigots 13R–13L.

Although the two freezing units 11R–11L have been illustrated as mounted in a single cabinet 8, it will be appreciated that each can have its own cabinet, and the two cabinets be placed side-by-side. In fact, one of the advantages of the present invention is that a pair of existing dispensing freezers can be easily converted to a machine of the described type.

It is believed that the invention will have been clearly understood from the foregoing detailed description of my now-preferred illustrated embodiments. Changes in the details of construction may be resorted to without departing from the spirit of the invention and is it accordingly my intention that no limitations be implied and that the hereto annexed claims be given the broadest interpretation to which the employed language fairly admits.

What we claim is:

1. In combination, a pair of dispensing freezers with respective freezing chambers arranged in side-by-side laterally spaced relation and opening to the front, each of said chambers have a respective selectively driven dasher, a removable cover for said freezing chambers and formed with a pair of outer spigots for said chambers and a center spigot therebetween, said spigots each having a respective vertical discharge bore, the vertical bores of said pair of spigots communicating with the front of the respective said freezing chambers, and the vertical bore of said center spigot communicating with the front of both of said chambers, respective vertically-operating normally-closed lift valves for said spigots a respective dasher control circuit for each of said dispensing freezers including a respective normally open switch arranged to be closed responsive to lifting of the respective valve, and switch closing means operatively associated with said switches and with said center valve for closing both switches responsive to lifting of the center valve.

2. The combination of claim 1 in which said switch closing means comprises a cross-rod with a center lever above said center valve and arranged to turn responsive to engagement of said lever by the head of the center valve during lifting thereof, and means on the opposite end portions of the cross-rod for closing both said switches responsive to such turning of the cross-rod, the latter said means normally being free of the travel paths of the pair of outer valves.

3. In combination, a pair of dispensing freezers with respective freezing chambers arranged in side-by-side laterally spaced relation and opening to the front, each of said chambers have a respective selectively driven dasher, a removable cover for said freezing chambers and formed with a pair of outer spigots for said chambers and a center spigot therebetween, said spigots each having a respective vertical discharge bore, the vertical bores of said pair of spigots communicating with the front of the respective said freezing chambers, and the vertical bore of said center spigot communicating with the front of both of said chambers, respective vertically-operating normally-closed lift valves for said spigots, a respective dasher control means for each of said dispensing freezers operatively associated with its respective said valve for independently starting its dasher responsive to lifting of such valve, and center control means operatively associated with both said control means and with the center valve for starting both said dashers responsive to lifting of the center valve.

4. In combination, a pair of dispensing freezers with respective freezing chambers arranged in side-by-side laterally spaced relation and opening to the front, each of said chambers have a respective selectively driven dasher, a removable cover for said freezing chambers and formed with a pair of outer spigots for said chambers and a center spigot therebetween, said spigots each having a respective vertical discharge bore, the vertical bores of said pair of spigots communicating with the front of the respective said freezing chambers, and the vertical bore of said center spigot communicating with the front of both of said chambers, respective valve-opening treadles interconnected with the outer lift valves, and dual depressing means interconnecting said treadles such that the treadles can be independently foot depressed or can both be depressed responsive to foot pressure on said dual depressing means.

5. The combination of claim 4 in which said dual depressing means comprises a cross-rod elastically coupled at its ends to said treadles.

6. In combination, a pair of dispensing freezers with respective freezing chambers arranged in side-by-side laterally spaced relation and opening to the front, each of said chambers have a respective selectively driven dasher, a removable cover for said freezing chambers and formed with a pair of outer spigots for said chambers and a center spigot therebetween, said spigots each having a respective vertical discharge bore, the vertical bores of said pair of spigots communicating with the front of the respective said freezing chambers, and the vertical bore of said center spigot communicating with the front of both of said chambers, respective vertically-operating normally-closed lift valves for said spigot, a respective removable cap on each of the outer lift valves whereby such valves and the cover can be removed as a unit leaving the cap assemblies, said center valve also being free to be removed with said cover, a pair of valve-opening treadles interconnected with respective of said caps, and dual depressing means interconnecting said treadles such that the treadles can be independently foot depressed or can both be depressed responsive to foot pressure on said dual depressing means.

7. The combination of claim 6 in which each of said dispensing freezers has a respective dasher control circuit including a respective normally open switch arranged to be closed by the cap of the respective valve during lifting thereof, and switch closing means including a lever above the center valve, said switch closing means being operatively associated with said switches for closing both switches responsive to lifting of the center valve into engagement with said lever.

References Cited
UNITED STATES PATENTS

| | | | |
|---|---|---|---|
| 2,737,024 | 3/1956 | Swenson | 62—342 X |
| 3,052,381 | 9/1962 | Carpigiani | 62—342 |
| 3,229,477 | 1/1966 | Erickson | 62—342 |
| 3,236,060 | 2/1966 | Clark | 62—135 |

ROBERT A. O'LEARY, *Primary Examiner.*

W. E. WAYNER, *Assistant Examiner.*